UNITED STATES PATENT OFFICE.

WILLIAM H. H. BURNHAM, OF EAST HOMER, NEW YORK.

IMPROVED ROOFING-CEMENT.

Specification forming part of Letters Patent No. 59,551, dated November 13, 1866.

*To all whom it may concern:*

Be it known that I, WM. H. H. BURNHAM, of East Homer, Cortland county, State of New York, have invented certain new and useful Improvements in Roofing-Cements; and do hereby declare that the following is a full, clear, and exact description of the same.

My invention consists in the admixture of certain ingredients for the preparation of an elastic cement for roofing or other similar purposes.

I take common coal-tar, quicklime, quicksand, and ashes, and mix them in quantities to suit the article, house-roof, or other thing to be covered. For roofing, I find that to one barrel of coal-tar, eighteen pounds quicklime, three bushels of sand, and one-half bushel of ashes, a roofing is of sufficient consistency to answer the purposes.

I do not wish to confine myself to any given quantities of the ingredients, as upon experiments made by me I can mix a good cement for houses, sidings, and boats by various quantities. The mere admixing of quicklime and coal-tar forms a good cement, or quicksand and coal-tar; but quicksand, quicklime, and coal-tar, with a small quantity of common ashes, thoroughly mixed, composes an elastic cement that not only answers for cold but warm weather.

The deficiencies in the ordinary roofing-cement is caused by the ingredients being of such kinds that the warm weather causes them to melt and run, while the cold weather makes them crack. My invention will obviate the aforesaid difficulty, and answers for any or all seasons of the year.

Having thus fully described my invention, what I claim as new, and desire to secure by Letters Patent, is—

The within-mentioned ingredients, coal-tar, quicklime, quicksand, and ashes, when mixed and used in the manner and for the purposes specified.

As evidence that I claim the foregoing I have hereunto set my hand in the presence of two witnesses.

WM. H. H. BURNHAM.

Witnesses:
  J. L. BARBER,
  D. MESSENGER.